Figure 1:
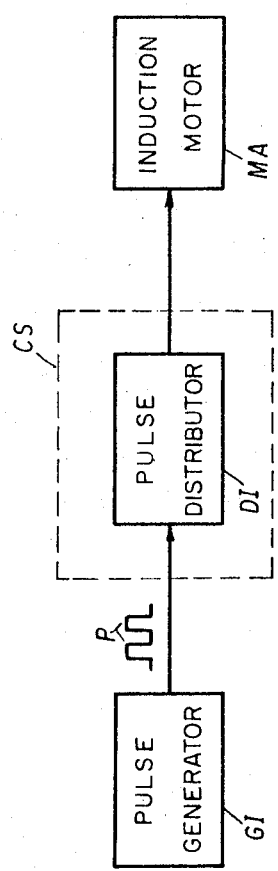

United States Patent

Kelemen et al.

[15] 3,665,498
[45] May 23, 1972

[54] SYSTEM FOR THREE-PHASE INDUCTION MOTOR

[72] Inventors: Arpad Kelemen; Mircea Crivii, both of Cluj, Romania

[73] Assignee: Institutul Politehnic Cluj, Cluj, Romania

[22] Filed: Mar. 5, 1970

[21] Appl. No.: 16,746

[30] Foreign Application Priority Data

Mar. 7, 1969   Romania..................................59296

[52] U.S. Cl.............................................318/227, 318/230
[51] Int. Cl. ........................................................H02p 5/40
[58] Field of Search..................................318/138, 227, 230

[56] References Cited

UNITED STATES PATENTS

| | | | |
|---|---|---|---|
| 2,887,640 | 5/1959 | Thomas.................................318/138 |
| 3,290,572 | 12/1966 | Hartmann et al......................318/138 |
| 3,424,962 | 1/1969 | Gawron.................................318/138 |
| 3,443,182 | 5/1969 | Graham.................................318/138 |
| 3,449,654 | 6/1969 | Sheldrake et al. .....................318/138 |
| 3,467,902 | 9/1969 | Shimizu et al. ........................318/138 |
| 3,495,149 | 2/1970 | Swain ...................................318/138 |

Primary Examiner—Gene Z. Rubinson
Attorney—Karl F. Ross

[57] ABSTRACT

The three phase windings of the stator of an induction motor are in series with respective thyristors connected across a source of direct current, the thyristors being capacitively interconnected in a lockout circuit whereby only one at a time can conduct. Connected in parallel with each phase winding is a circuit including the output of a generator of unipolar switching pulses and the primary of a transformer whose secondary lies in the input of the thyristor next in line whereby the latter is rendered conductive in response to a switching pulse traversing the previously conductive thyristor. By switching the pulse generator to a set of alternate transformer primaries connected to the thyristor outputs in a different order, the sense of motor rotation can be reversed.

6 Claims, 2 Drawing Figures

SYSTEM FOR THREE-PHASE INDUCTION MOTOR

Our present invention relates to a system for regulating the speed of a three-phase induction motor with short-circuited or wound rotor.

The object of our invention is to provide a system of this type offering the following advantages:

a. enabling speed regulation over a wide range by means of a control circuit without movable parts;
b. permitting rapid braking to arrest the motor and its load;
c. allowing a reversal of the sense of rotation without phase inversion;
d. facilitating digital control without the need for an analog/digital converter.

This object is realized, pursuant to our present invention, by the provision in such a system of three thyristors (solid-state controlled rectifiers) connected in series with respective phase windings of the motor stator across a source of direct current having one of its poles tied to an output terminal of a generator of unipolar switching pulses. The main electrodes, i.e. the anode and the cathode, of each thyristor also lie in series with a primary winding of one of three transformers whose secondary winding lies in a trigger circuit of a different thyristor, i.e. the thyristor next in line in a predetermined firing sequence, this trigger circuit extending between one main electrode (cathode) and a control electrode (gate) of the latter thyristor. With the primary windings of all three transformers connected in parallel to the other output terminal of the pulse generator, and with the several thyristors interconnected in a reactive lockout circuit allowing the conduction of only one thyristor at a time as is well known per se, the passage of switching pulse through the momentarily conductive thyristor fires the thyristor next in line and quenches the conducting one; in this manner, successive switching pulses are distributed to the thyristors in the order of their firing sequence.

Figure 2:
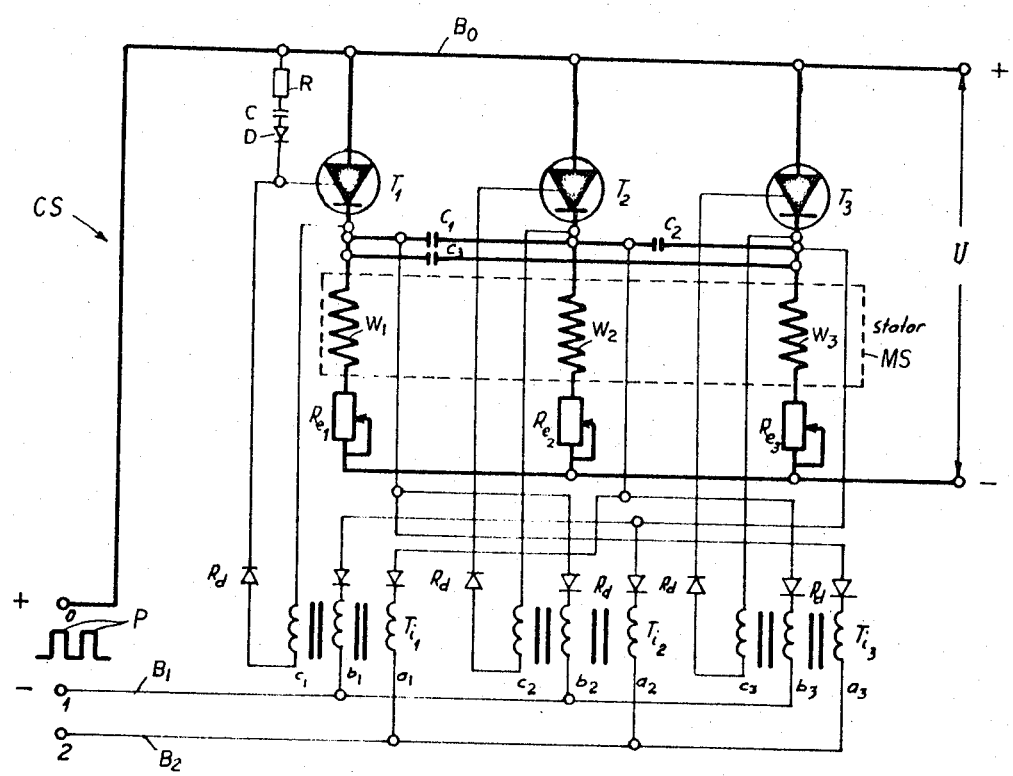

The invention will be described in detail hereinafter with reference to the accompanying drawing in which:

FIG. 1 is a block diagram of a representative embodiment of a control system according to our invention; and FIG. 2 is a circuit diagram of a pulse distributor, included in the system of FIG. 1, connected to the stator of an associated induction motor.

As shown in FIG. 1, a pulse generator GI delivers a train of unipolar (here positive) pulses P to a pulse distributor DI forming part of our improved control system CS. This system serves to regulate the speed of an induction motor MA and, if desired, to reverse the sense of rotation of its rotor.

FIG. 3 shows the stator MS of motor MA provided with three phase windings $W_1$, $W_2$ and $W_3$ each connected across a source of d-c voltage U in series with the anode-cathode path of a respective thyristor $T_1$, $T_2$, $T_3$ and with an adjustable resistor $Re_1$, $Re_2$, $Re_3$. A bus bar $B_0$ connects the positive pole of source U to an output terminal O of pulse generator GI (FIG. 1) whose other output terminal 1 is tied to another bus bar $B_1$ but may be alternatively connected to a third bus bar $B_2$. The cathodes of thyristors $T_1$, $T_2$, $T_3$ are reactively interconnected by three capacitors $C_1$, $C_2$, $C_3$ constituting a lockout circuit; upon the firing of any previously non-conductive thyristor, its cathode is driven sharply positive to apply a quenching pulse to the cathodes of the two other thyristors as is well known per se.

The gate and the cathode of each thyristor are connected in a trigger circuit including, besides a diode Rd, a secondary winding $c_1$, $c_2$ or $c_3$ of a respective transformer $Ti_1$, $Ti_2$, $Ti_3$. Transformer $Ti_1$ has two primary windings $a_1$ and $b_1$ connected, via individual diodes Rd, in a pair of alternate energizing circuits, the circuit of winding $a_1$ extending from the cathode of thyristor $T_2$ to bus bar $B_2$ whereas the circuit of winding $b_1$ extends from the cathode of thyristor $T_3$ to bus bar $B_1$. In an analogous manner, transformers $Ti_2$ and $Ti_3$ have primary windings $a_2$, $a_3$ connected in circuits extending from bus bar $B_2$ to thyristors $T_3$ and $T_1$, respectively, as well as primary windings $b_2$, $b_3$ connected in circuits extending from bus bar $B_1$ to thyristors $T_1$ and $T_2$, respectively.

A starting circuit, extending from positive bus bar $B_0$ to the gate of thyristor $T_1$, comprises a resistor R, a condenser C and a diode D in series. When bus bar $B_0$ is first connected to source U, thyristor $T_1$ is triggered into conduction to pass the first pulse P arriving from generator GI.

With the switching pulses P delivered to bus bars $B_0$ and $B_1$, as shown, the latter bus bar is driven negative (as indicated by the minus sign) upon the occurrence of any such pulse so that one of the primaries $b_1$, $b_2$, $b_3$, i.e. the one lying in series with the momentarily conductive thyristor, is energized to trigger the thyristor next in line, specifically the thyristor $T_2$ upon previous conduction of thyristor $T_1$ and the thyristor $T_3$ upon previous conduction of thyristor $T_2$. This corresponds to sequential energization of phase windings $W_1$, $W_2$, $W_2$ in cyclic succession.

If, on the other hand, the pulses P are developed between bus bars $B_0$ and $B_2$, thyristor $T_3$ fires immediately after thyristor $T_1$ so that the sequence of energization is reversed.

From the foregoing description it will be apparent that the magnetic field of the stator rotates intermittently, rather than continuously as in the case of a three-phase motor supplied with sinusoidal voltage. The current induced in the rotor upon the de-energization of one phase interacts with the magnetic flux produced by the stator upon energization of the next phase to generate a pulsating torque with consequent angular displacement of the rotor in descrete steps. The motor speed can be varied by changing the operating frequency of pulse generator GI.

To arrest the motor it is merely necessary to switch off the pulse generator GI whereupon one of the stator windings will remain energized with direct current from source U, thereby creating a stationary magnetic field. The magnitude of the braking torque exerted by this field depends upon the intensity of the current flow which in turn is controlled by the adjustable resistor $Re_1$, $Re_2$ or $Re_3$.

We claim:

1. A speed-regulating system for an induction motor having a stator provided with three phase windings, comprising:
    a source of direct current;
    three thyristors connected in series with respective phase windings of the stator in three parallel current paths across said source, each of said thyristors having a pair of main electrodes in the corresponding current path and a control electrode forming a trigger circuit therefor together with one of said main electrodes, said main electrodes being an anode and a cathode;
    a generator of unipolar switching pulses provided with a first and a second output terminal, said first output terminal being connected to a pole of said source;
    three transformers each having at least one primary winding connected between said second output terminal and a main electrode of a respective thyristor, each transformer further having a secondary winding included in the trigger circuit of a different one of said thyristors for rendering the latter conductive in response to a switching pulse traversing said primary winding by way of said respective thyristor in the conductive state thereof; and
    a reactive lockout circuit interconnecting said thyristors for quenching any previously conductive thyristor upon firing of another thyristor;
    each of said transformers being provided with a further primary winding connected to a main electrode of the remaining thyristor, other than said respective transistor and said different thyristor, said second output terminal being selectively connectable to said further primary winding in lieu of said one primary winding for reversing the sense of rotation of said motor.

2. A system as defined in claim 1 wherein said lockout circuit comprises a set of three capacitors bridging the cathodes of different pairs of thyristors.

3. A system as defined in claim 1, further comprising a reactive starting circuit connected between the control electrode and the anode of one of said thyristors for initially rendering same conductive upon connection of said anode to the positive pole of said source.

4. A system as defined in claim 3 wherein said starting circuit comprises a condenser and a diode in series.

5. A system as defined in claim 1, further comprising a variable resistance in series with each of said phase windings.

6. A system as defined in claim 1, further comprising a diode in series with each winding of each of said transformers.

* * * * *